Figure 1:
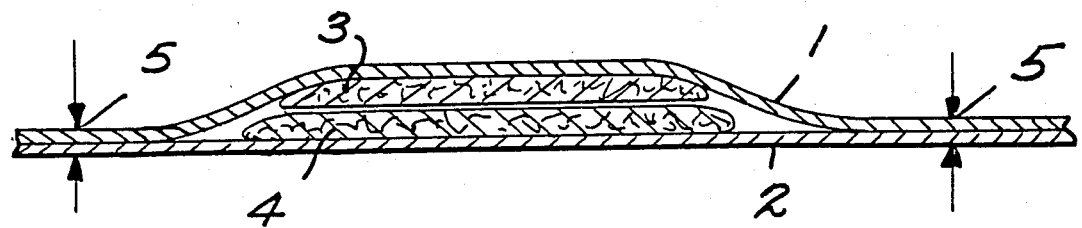

United States Patent [19]

Hensler

[11] Patent Number: 4,657,609

[45] Date of Patent: Apr. 14, 1987

[54] PROCESS FOR PRODUCING CUSHIONINGS FOR SKI BOOTS, IN PARTICULAR FOR THE PRODUCTION OF INNER BOOTS OF SKI BOOTS

[75] Inventor: Adolf Hensler, Köflach, Austria

[73] Assignee: Koflach Sportgerate Gesellschaft, Vienna, Austria

[21] Appl. No.: 773,366

[22] Filed: Sep. 6, 1985

[30] Foreign Application Priority Data

Sep. 13, 1984 [AT] Austria .................. 2921/84

[51] Int. Cl.$^4$ .............................................. B29C 65/02
[52] U.S. Cl. .......................................... 156/70; 36/117; 36/119; 156/275.1; 156/276; 156/292; 156/380.6; 428/76
[58] Field of Search .................. 36/117, 119; 156/70, 156/275.1, 276, 292, 380.6; 428/76

[56] References Cited

U.S. PATENT DOCUMENTS

| 2,028,388 | 1/1936 | Gerard et al. | 156/276 X |
|---|---|---|---|
| 2,878,153 | 3/1959 | Hackländer | 264/284 X |
| 3,437,776 | 4/1969 | Schaeffer et al. | 156/380.8 X |
| 3,462,007 | 8/1969 | Heider et al. | 156/276 X |
| 3,701,707 | 10/1972 | Scholl et al. | 156/380.7 |
| 3,914,881 | 10/1975 | Striegel | 36/44 |
| 4,055,456 | 10/1977 | Carnegie | 156/583.2 X |
| 4,083,742 | 4/1978 | Sugimoto | 156/292 X |
| 4,154,637 | 5/1979 | Kasten | 156/276 |
| 4,216,046 | 8/1980 | Hackert | 156/292 X |
| 4,229,546 | 10/1980 | Swan, Jr. | 521/55 |
| 4,304,824 | 12/1981 | Karpinski | 428/76 X |

FOREIGN PATENT DOCUMENTS 0013269 7/1980 European Pat. Off. .

Primary Examiner—Robert A. Dawson
Attorney, Agent, or Firm—Cushman, Darby & Cushman

[57] ABSTRACT

For producing cushionings, a first layer (11) of thermoplastic, weldable synthetic material is placed into a templet (17), whereupon a padding material (12, 13, 14, 15) is placed thereon as an intermediate layer. The padding material thereby keeps uncovered areas of the first layer (11), which areas are subsequently welded with a second layer (16) of thermoplastic, weldable synthetic material placed onto the padding material (14). Welding is only effected at areas in which the layers (11, 16) are, without interposition of padding material, directly pressed one against the other. The inner contour (18) of the templet (17) essentially corresponds to the outer contour of the layers (11, 16). The templet (17) is formed of a material having high dielectric losses, so that a tight welding seam is reliably obtained at the edge of the layers (11, 16).

8 Claims, 5 Drawing Figures

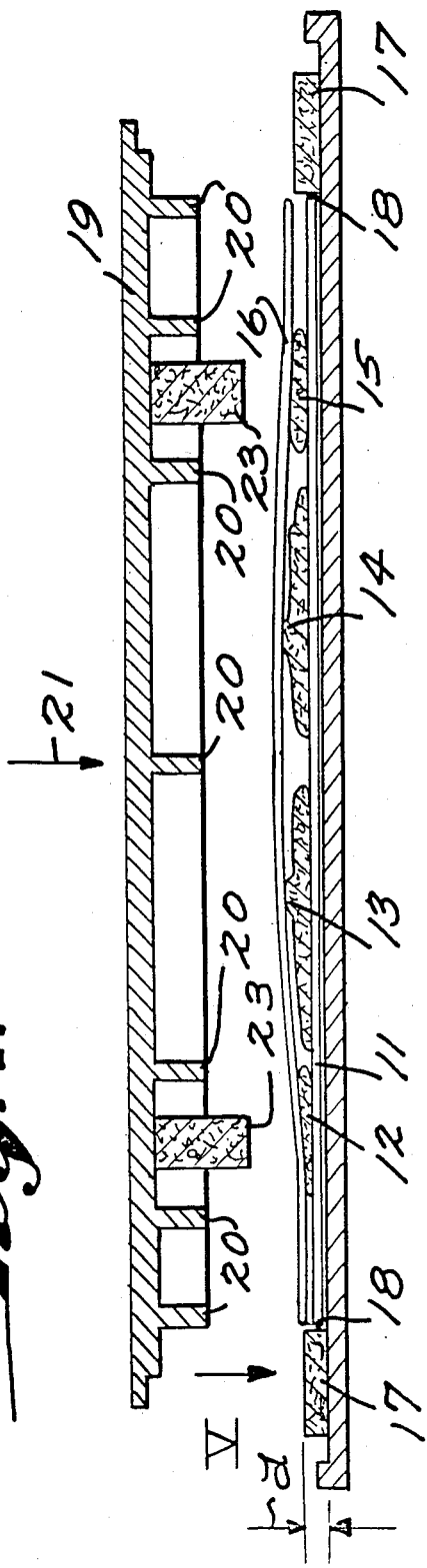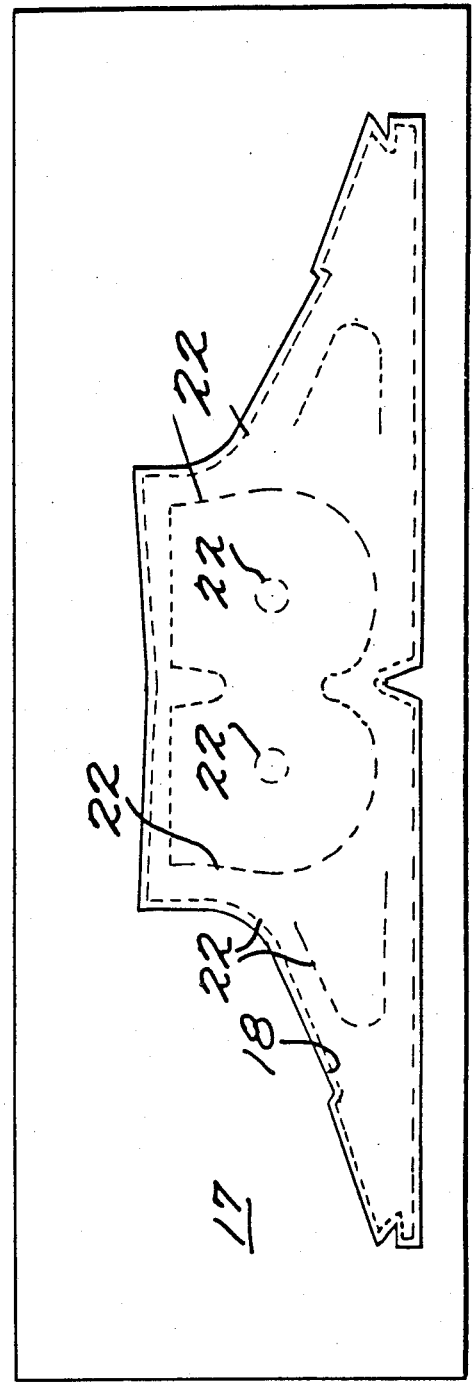

PROCESS FOR PRODUCING CUSHIONINGS FOR SKI BOOTS, IN PARTICULAR FOR THE PRODUCTION OF INNER BOOTS OF SKI BOOTS

The invention refers to a process for producing cushioning material for ski boots, in particular for producing inner boots for ski boots, comprising an outer layer and an inner layer of weldable, thermoplastic synthetic material and intermediate layers of a padding material, in which process the padding material is placed on one of both layers, whereupon the second layer is placed thereon and the padding material is fixed in its position by directly welding said both layers at areas being free of padding intermediate layers.

For the production of inner boots and cushioning areas in inner boots it is already known to use multilayer structures, connection of the layers having been effected by known process measures such as glueing, welding or sewing. From EP-A-13 269 it is already known to make the padding material from a thermoplastic material and to provide the exact position of the cushioning areas by melting under the action of heat the porous structure by means of a press stamp and to directly attach both outer layers one to the other by melting down the cushion layer located therebetween. It is a drawback of these procedures that the edge of the welded areas is relatively hard because the padding material becomes molten down within this area and thereby looses its porous structure.

The invention now aims at using the advantages obtainable by welding foils and to use any desired padding materials and to produce cushions of various thickness without any drawback at the connecting area between the sheets of synthetic plastics material forming said both outer layers and in particular without hard edges of the cushioning areas. For solving this task, the invention essentially consists in that the first of said both layers is inserted into a templet corresponding to the outer contour of this layer and in that subsequently the padding intermediate layers are placed thereon and the second layer is placed into the templet, whereupon welding is effected by means of a welding stencil corresponding to the inner contour of the templet. Such a procedure provides the possibility to use padding materials of any desired type, in particular also padding materials without any thermoplastic properties such as, for example, wadding, and the exact position of the padding is reliably provided by the welding operation. The padding itself is maintained in position between said both welded layers only by the weld seams and is maintained completely free of fixing means such as glued areas or welded areas.

The welding seams form chambers, closed at all sides, for the enclosed padding material. In this manner, several layers of padding material can be superpositioned within areas where a higher cushioning layer is desired and the cushioning can individually be adjusted to the requirements to be expected during assembling or during placing the padding onto the first of both layers to be welded together. The subsequent welding operation will not change the properties, because the welding operation is only concerned with said outer layers and does only fix in position by the welding seams the intermediate padding having differing cushion height and differing cushioning properties. In connection with greater cushioning areas, the process according to the invention is in a simple manner performed such that interrupting areas are provided within the cushioning areas, the weldable layers being directly connected one with the other within said interrupting areas.

Because a templet corresponding to the outer contour of the layer is used, any change of the position of said both layers as well as of the intermediate padding layers during lowering the welding stencil is reliably prevented, thereby providing the possibility to do with relatively thin welding ribs. The use of a templet provides considerable advantages in connection with securing the position particularly when using cushioning intermediate layers of great height differences over a relatively great area. For providing complete security against lateral evading of one of said both layers or against shifting of the padding intermediate layers, the procedure is preferably such that the thickness of said both layers is, at least at the edge of the templet, selected approximately equal the unobstructed height of the templet as measured in direction of operating movement of the welding stencil.

It is the essential advantage of the process according to the invention that one can do without adhesives and other means for providing position stability, which adhesives or means could subsequently become brittle and have an only limited stability, and that the padding material itself is not participating the welding operation. In contrast to known processes in which both layers are sewed one with the other, the process according to the invention provides the possibility to prestress both layers prior to the welding operation, so that subsequently the blanks formed are already given a prestress in direction of the desired pleating, for example for producing an inner boot. The process according to the invention provides the possibility to keep both layers tensioned within frames and to hold also both layers with differing tension, so that the welded part is directly given a prestress in direction of its subsequent pleating. When forming inner boots, both layers to be welded one with the other are therefore in an advantageous manner clamped into frames with differing laminar prestress.

Furthermore, the use of a templet provides the possibility to improve in a simple manner the quality of the outermost welding seam. The outermost welding seam must be extremely tight for preventing humidity to enter the interior between said both layers and to arrive at the strongly adsorbent padding layers. If, as it corresponds to a preferred mode of operation, the templet consists of a material of high dielectric losses, in particular polyvinyl chloride, the templet is heated within the area of these outermost welding seams and thus reliably provides for a longer influence of the heat by the welding process. Above all, any premature cooling prior to obtaining a reliable welding connection at the area of the edges is prevented, so that tightness of the connection is improved.

For achieving the object that, when using a templet, individual partial areas of the intermediate layer completely fill the chambers formed after producing the welding connection and for the purpose to be in the position to definitely influence certain cushioning properties, the procedure is preferably such that the welding stencil is moved into welding position and pressed against the welding areas with interposition of nonweldable, non-metallic material of low dielectric losses, preferably of such elastically deformable material, at areas to be kept free of welding seams. In this manner, partial areas of the cushioning intermediate layer can be compressed during the welding operation, whereupon the padding material is elastically expanded after having made the welding seams and the respective chambers housing the compressed padding material become completely filled by the padding material.

Cushioned areas of greater extent can preferably be designed such that cushioning areas of greater extent are provided with non-cushioned interruptions within which the weldable layers are directly connected one with the other, the non-cushioned interruptions being preferably formed of punctiform welding connections within the areas maintained free of padding material.

In the following, the invention is further explained with reference to embodiments schematically shown in the drawing. In the drawing, FIG. 1 shows a cross section through a cushioning area produced according to the invention, FIG. 2 shows a top plan view of a cushioning area differing from that shown in FIG. 1, FIG. 3 shows a section along line III—III of FIG. 2, FIG. 4 shows a schematic section through an apparatus for performing the process according to the invention and FIG. 5 shows a top plan view in the sense of the arrow V of FIG. 4 of the templet used in the apparatus according to FIG. 4.

In FIG. 1, an outer layer 1 of a weldable thermoplastic synthetic material is connected with the inner layer 2 of synthetic plastics material being weldable to the outer layer 1. Between said both layers 1 and 2 there are provided cushioning areas, for example of wadding, noting that for obtaining the desired height of the cushion there are provided two different layers of padding material 3 and 4. The welding areas are designated by 5 and are located outside of the contour of the padding material, so that welding operation per se is performed without influencing the padding layers.

Figure 2:
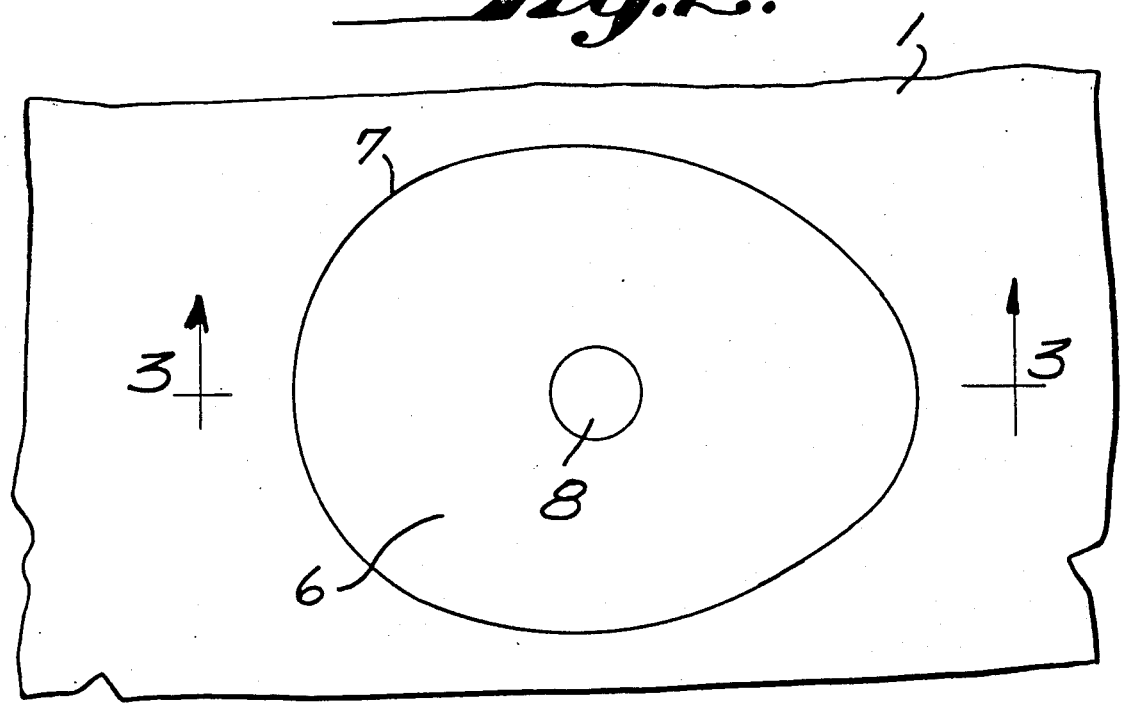
Figure 3:
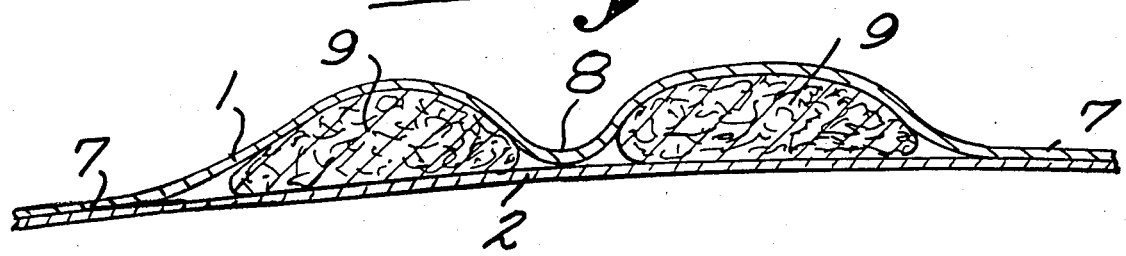

In the embodiment according to FIG. 2, there is shown the outer layer 1 which delimits a cushioning area 6 by a circular welding seam 7. On account of the cushioning area 6 having a relatively great extent, a central area, designated by 8, of the cushioning is maintained free for better positioning the cushion. As can be taken from the cross section according to FIG. 3, the outer layer 1 is directly welded with the inner layer 2 within the area 8, so that the annularily arranged cushions 9 are maintained in their exact position within the area of the circular welding seam 7 in inward direction as well as in outward direction.

An apparatus for performing the process according to the invention is schematically shown in FIG. 4. Reference numeral 10 designates a welding table onto which a first layer 11 of weldable thermoplastic synthetic material is placed. This first layer forms the upper skin and is subsequently used as the outer side when making the inner boot. Onto this first layer 11 there are placed cushion layers 12, 13, 14 and 15 in the desired position, whereupon the second layer of weldable thermoplastic synthetic material is placed thereon, which second layer is, in the following, used as the lining and is designated by 16. On the welding table 10 there is fixed a templet 17, the inner contour 18 of which corresponds to the contour of the layers to be welded one with the other. The height of the templet 17 is designated by a and dimensioned such that it corresponds approximately to the thickness of both layers 11 and 16 at the edges to be welded together. In each case, the height a shall be dimensioned such that it is greater than the thickness of the layer 11, so that also the lining layer 16 can be maintained in position by the templet. For the welding operation, a welding stencil 19 comprising welding ribs 20 is moved in direction of arrow 21. The welding ribs form, in the following, the welding seams being indicated by 22 in FIG. 5. The templet 17 shown in FIG. 5 in a top plan view consists of polyvinyl chloride and thus becomes heated within the area of the inner contour 18 which is adjacent the outermost welding rib 20 of the welding stencil 19. The outer welding seam thus cools down with a reduced speed. Reference numeral 23 indicates non-weldable and elastically deformable parts by means of which can be compressed partial areas of the padding during welding operation.

What is claimed is:

1. Process for producing a cushioning material for ski boots, in particular for producing inner boots for ski boots, comprising an outer layer and an inner layer of weldable, thermoplastic synthetic material and intermediate layers of padding material, in which process the padding material is placed on one of the layers, whereupon the other layer is placed thereon and the padding material is fixed in its position by directly welding both layers at areas which are free of cushioning intermediate layers, characterized in that said first layer is inserted into a templet corresponding to the outer contour of this layer and that subsequently the cushioning intermediate layers are placed thereon and said other layer is placed into the templet, whereupon welding is effected by means of a welding stencil corresponding to the inner contour of the templet.

2. Process as claimed in claim 1, characterized in that the thickness of both layers is, at least at the edge of the templet, at most equal the unobstructed height (a) of the templet as measured in direction of the operating movement of the welding stencil.

3. Process as claimed in claim 1, characterized in that the welding stencil is moved into welding position and pressed against the welding areas with interposition of non-weldable, non-metallic material of low dielectric losses at the areas to be kept free of welding seams.

4. Process as claimed in claim 1, characterized in that the templet is formed of a material of high dielectric losses.

5. Process as claimed in claim 1, characterized in that cushioning areas of greater extent are provided with non-cushioned interruptions within which the weldable layers are directly connected one with the other.

6. Process as claimed in claim 1, characterized in that the non-cushioned interruptions are formed of punctiform welding connections within the areas maintained free of padding material.

7. Process as in claim 3 wherein said non-metallic material of low dielectric losses is elastically deformable material.

8. Process as in claim 4 wherein said material of high dielectric losses is polyvinyl chloride.

* * * * *